UNITED STATES PATENT OFFICE.

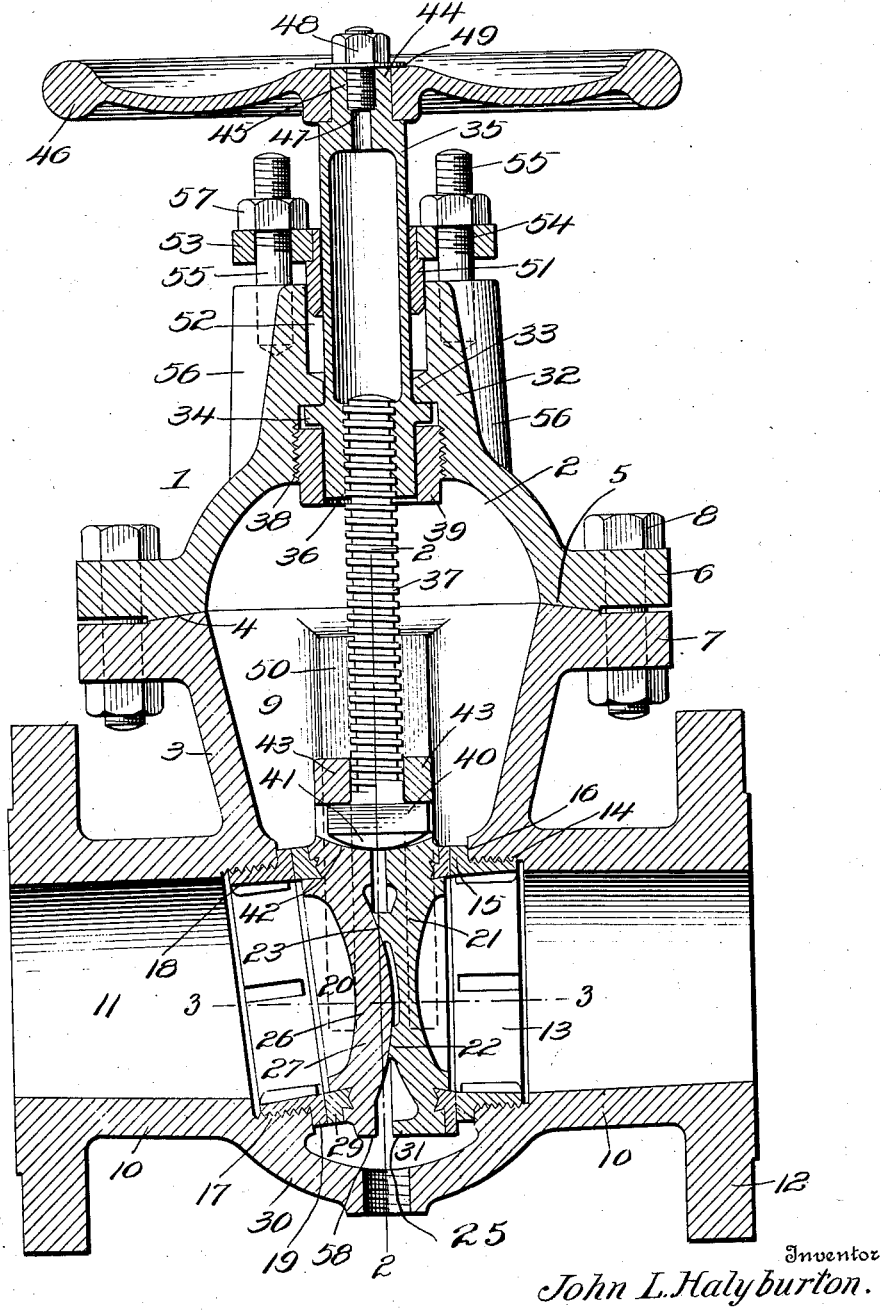

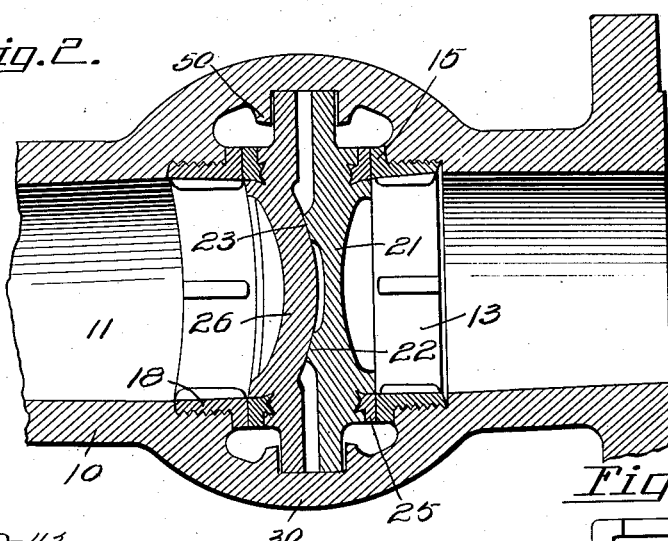
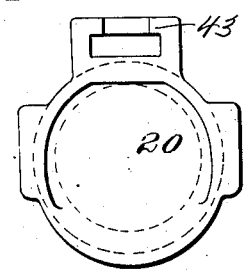
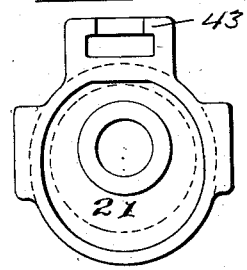
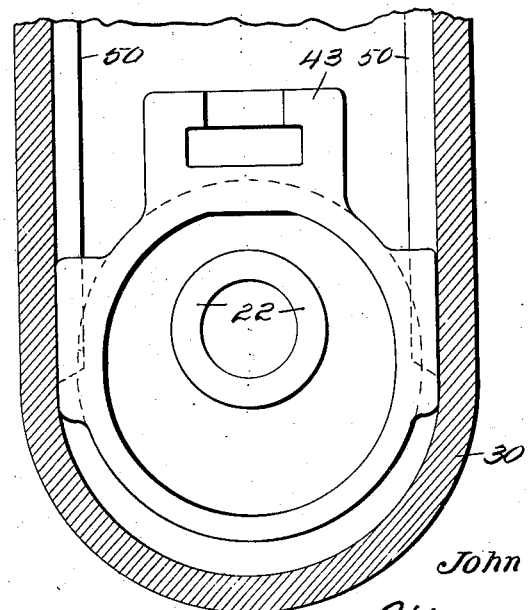

JOHN L. HALYBURTON, OF HAMPTON, NEW JERSEY.

STRAIGHTWAY VALVE.

974,055.  Specification of Letters Patent.  Patented Oct. 25, 1910.

Application filed May 4, 1909. Serial No. 493,780.

*To all whom it may concern:*

Be it known that I, JOHN L. HALYBURTON, a citizen of the United States, residing at Hampton, in the county of Hunterdon and State of New Jersey, have invented new and useful Improvements in Straightway Valves, of which the following is a specification.

This invention relates to valves, and more particularly to those of the straightway type, and has for an object to provide a valve having a pair of disks arranged to form the gate of the valve, the said disks being provided with spherical back faces so engaged with each other as will permit of universal adjustment of the disks so that the said gate can be effectively moved into frictional contact with the co-acting valve seats.

Another object of my invention is to provide a valve in which the spherical faces of the gate disks are so disposed with respect to each other that they will produce the uniform resistance to provide a solid structure through the runway of the valve.

A still further object of this invention is to provide a disk disposed in a line perpendicular to the axial line of the operating stem and to provide a second disk associated with the first disk and provided with a beveled or inclined face occupying a point at one side of the axial line of the stem, whereby when the gate formed by the provision of the said disks is raised the disk having the inclined or beveled face will leave its seat before the associating disk has left its seat so that the full force of the pressure in the runway will be applied to the one disk, or in other words the disk which, as stated, is arranged in a perpendicular line to the axial line of the valve stem.

A still further object of my invention is to provide a valve having a perpendicular disk associated with a disk having a beveled or tapered face at the side of the axial line of the stem, and to provide the last named disk with a depending lip at its lower end arranged to effectively protect the face of said disk, and to provide the first named or perpendicular disk with a depending lip portion disposed beneath the plane of the lowermost portion of the seat of the second named disk, the said lip portions serving as stated to protect the face of the tapered gate from the force of the flow of liquid or fluid through the runway of the valve.

Other objects and advantages will be apparent as the nature of the invention is better set forth, and it will be understood that changes within the scope of the claims may be resorted to without departing from the spirit of the invention.

In the drawings, forming a portion of this specification and in which like numerals of reference indicate similar parts in the several views:—Figure 1 is a vertical section through the valve showing the gate in its lowered or closed position. Fig. 2 is a detail horizontal section taken on the line 2—2 of Fig. 1. Fig. 3 is a detail section taken on the line 3—3 of Fig. 1. Fig. 4 is a detail elevation of one of the disks. Fig. 5 is a detail elevation of the other disk.

Referring now more particularly to the drawings, there is shown a valve having a casing 1 which preferably consists of an upper section 2 and a lower section 3, the latter having an inclined or beveled annular face 4 for co-engaging a correspondingly formed face 5 upon the section 2. The section 2 is provided with a clamping flange 6 and the section 3 with a flange 7, and the said flanges have engaged therewith clamping bolts or suitable retaining devices 8. This construction is such that access can be gained to the chamber 9 formed by the sections 2 and 3 of the casing. The section 3 of the herein described casing is provided with oppositely extending alining tubular portions 10 adapted to form a horizontal runway 11. The tubular portions 10 may be provided with flanges 12 at their outer ends so that the valve casing can be effectively and conveniently engaged with pipe connections or other elements upon which the valve is to be used.

A perpendicular valve seat is shown at 13 and consists preferably of an exteriorly threaded sleeve engaged removably with an interiorly threaded portion 14 of one of the tubular portions 10 of the casing, and as illustrated the sleeve forming the valve seat is provided upon its inner face with an annular seat portion or shoulder 15 which has its inner face frictionally engaged with a shoulder 16, as shown. The opposite portion 10 of the valve casing is provided with an interiorly threaded portion 17 with which is engaged the exteriorly threaded sleeve or valve seat 18 which latter is arranged diagonally to the axial line of the valve stem which latter will be hereinafter more fully described. As shown, the valve sleeve or seat is provided with an annular shoulder or seat proper 19 corresponding with the seat proper or shoulder 15 previously described.

A gate 20 is employed by me and consists of a vertically disposed disk 21 which is provided with a centrally located face of concavo-convex form from which extends an annular friction shoulder 22 having a beveled face 23 for a purpose to presently appear. The disk 21 is provided with a lip portion 25 which extends downwardly and at a plane beneath the seat 15 at its lower extremity. An associating disk 26 is employed to complete the gate 20 and this disk is provided with a concavo-convex body portion 27 having its back engaged with the beveled face or back 23 of the disk 21 and forms means whereby the disks are disengaged from each other at the center and the pressure on the backs of the disks made uniform. This arrangement allows the disks to change their relative position to each other and adjust themselves automatically to their seats. The disk 26 is provided with a contact ring 29 to engage the shoulder 19. In view of the construction of the disk 26 it is arranged diagonally to the axial line of the valve stem. At the bottom the section 3 of the valve casing is provided with a portion 30 in which is formed a chamber 31 adapted to communicate with the runway 11 formed by the portions 10 of the valve and the provision of this chamber will be understood as the essence of the invention is better disclosed. I have described hereinbefore the disk as being of concavo-convex form but it is obvious that such formation would broadly result in the disks having spherical backs co-engaging each other for universal movement, and for convenience the said disks will be described hereinafter as just mentioned.

The section 2 of the casing 1 is provided at its upper end with a vertically disposed tubular portion or sleeve 32 in which is formed an annular flange or shoulder 33 and beneath the said shoulder is disposed an annular flange or collar 34 of an operating stem 35. The operating stem is of hollow form and the lower end is provided with a threaded bore 36 in which a correspondingly threaded adjusting stem 37 is mounted or engaged. The portion 32 of the casing is provided with a threaded passage 38 which receives a plug 39 adapted to be spaced from the shoulder 33 so as to support the collar 34 and to confine the same in the space between the shoulder 33 and the upper annular edge of the plug. This construction permits free rotation of the stem 35 so that in rotation thereof the adjusting stem 37 can be effectively operated. At the lower end the stem 37 is provided with a squared horizontally disposed head 40 provided with a semi-elliptical portion or curved bottom face 41 disposed immediately above correspondingly formed faces 42 of the gate disks and adapted to engage said faces. The gate disks are provided with vertical extensions 43 which surround the lower extremity of the stem 37 and are disposed above the squared head 40 so that in operation of the stem 37 the gate can be effectively raised or lowered at the will of the operator. The stem 35 is provided with a reduced upper end portion 44 having a threaded passage 45, and as shown the portion 44 receives the hub portion of a sleeve actuating wheel 46, and the passage 45 receives a screw 47 with which is engaged a clamping nut 48 adapted for frictional contact with a washer 49 so that the latter can be effectively forced into engagement with the hub portion of the wheel 46 and with the upper end of the reduced portion 44.

The disks forming the gate 20 are slidable between guides 50 located at diametrically opposite points of the section 3 of the casing 1. This construction allows for the perfect movement of the gate as will be fully appreciated. A bushing 51 has its lower extremity disposed in a channel 52 formed in the tubular portion 32 of the section 2 and has engaged therewith at its upper end a collar 53 having passages 54 for receiving stud bolts 55 which extend upwardly and vertically from lugs 56 upon the portion 32. The stud bolts are provided with adjusting nuts 57 adapted for frictional engagement with the collar 53 so as to force the same downwardly to effectively move the bushing into its operative position.

It will be seen that the angle of the gate or taper thereof is located only on one side of the axial line of the stem 37 which, when in operation of the gate, will cause it to leave its seat very rapidly as will be understood. The gate 26 is provided at its lower end with a lip 58 which is disposed opposite the lip 25 of the disk 21 which when in conjunction with said lip effectively protects the face of the tapered or inclined gate from the force of the flow of fluid in the runway 11.

The construction as herein described is such that when the stem 37 is operated the disk 26 will leave its seat 19 before the disk 21 will leave its seat which will permit the flow of fluid to be deflected first into the chamber 31 and will obviate the said disk 26 receiving the force of the flow as stated and will subject the perpendicular disk 21 to the entire strain. By providing disks of the form herein shown they will offer a considerable amount of resistance. It is obvious that the means herein employed by me are such that incident to the fact that the disk 26 partly leaves its seat prior to a corresponding movement of the disk 21 water or liquid will be carried first into the chamber 31 beneath the disks, and immediately after the movement of the water as just described the disk 21 will be in its partly open position to permit a continuation of the flow. This provision is made for the accumulation of all foreign matter or gritty substance in the chamber 31 and obviates such matter or substance coming into direct contact with the disk 26. It will of course be understood, however, that the disk 21 is subjected to more use than its associate.

As hereinbefore stated the angle of the gates is placed all on one side of the axial line of the stem which causes the tapered section 26 to leave its seat approximately twice as fast as the perpendicular section 21. This in the conjunction with the lip 25 at the bottom of the perpendicular section is such that the said perpendicular disk is subjected to the most strain and abuse, due to the wire drawing action, scale or foreign matter which might be in the line and the said lip also allows the tapered gate to be moved upwardly in advance and away from its seat before the port of the perpendicular gate is uncovered, thus reducing the resistance to flow at the tapered gate and consequently protecting it and prolonging its efficiency and tightness.

I claim:—

1. The combination with a valve casing having a runway, seats located in the runway and disposed at an angle to each other, a movable stem carried by said casing, a gate comprising disks of concavo-convex form operatively connected with said stem and having their convex backs frictionally engaged with each other, and rings carried by the disks and disposed at an angle to each other and at the sides of the axial line of the stem.

2. A valve comprising a casing having a runway, a movable stem, a perpendicular valve seat arranged in the runway, a seat opposing the first named seat and disposed diagonally to the axial line, and disks of concavo-convex form having their convex backs arranged in opposing relation and adapted for frictional engagement with each other, said disks being adapted to be engaged with the seats to close the runway and connected with the stem so that they can be moved simultaneously upon operation of the latter.

3. A valve comprising a casing having a runway therein, a movable stem, a perpendicular valve seat arranged in the runway, a seat arranged diametrically opposite the first named seat and disposed diagonally to the axial line of the stem, disks of concavo-convex form having their convex backs arranged in opposing relation and adapted for frictional engagement with each other, said disks being adapted to be engaged with the seats to close the runway and connected with the stem so that they can be moved simultaneously in movement of the latter, and downwardly extending lips upon the disks and disposed below the runway when the disks are in their closed positions.

4. A valve comprising a casing having a runway, a movable stem, a perpendicular valve seat arranged in the runway, a seat opposing the first named seat and disposed diagonally to the axial line of the stem, disks having frictionally engaged back portions and having portions formed to co-operate with the said seats, the said casing being formed to provide a chamber below the runway and at a point directly below the disks, and lips upon the disks and extending downwardly into the said chamber.

In testimony whereof I affix my signature in presence of two witnesses.

JOHN L. HALYBURTON.

Witnesses:
  E. P. BAYLOR,
  T. J. RABER.